(12) United States Patent
Rettig

(10) Patent No.: US 9,139,239 B1
(45) Date of Patent: Sep. 22, 2015

(54) AERODYNAMIC MULTIPLE TRAILER SYSTEM

(71) Applicant: Alan Rettig, Munford, TN (US)

(72) Inventor: Alan Rettig, Munford, TN (US)

(*) Notice: Subject to any disclaimer, the term of this patent is extended or adjusted under 35 U.S.C. 154(b) by 0 days.

(21) Appl. No.: 14/499,411

(22) Filed: Sep. 29, 2014

(51) Int. Cl.
*B62D 35/00* (2006.01)

(52) U.S. Cl.
CPC .................................... *B62D 35/001* (2013.01)

(58) Field of Classification Search
CPC ........................................................ B62D 35/001
USPC .................. 296/180.1, 180.2, 180.3, 180.4
See application file for complete search history.

(56) References Cited

U.S. PATENT DOCUMENTS

| | | | | | |
|---|---|---|---|---|---|
| 4,343,505 | A | * | 8/1982 | Levassor | 296/180.2 |
| 4,756,256 | A | * | 7/1988 | Rains et al. | 105/1.1 |
| 6,428,084 | B1 | * | 8/2002 | Liss | 296/180.3 |
| 8,083,284 | B1 | * | 12/2011 | Logounov | 296/180.2 |
| 8,167,358 | B2 | * | 5/2012 | Burrows | 296/180.1 |
| 8,496,285 | B2 | * | 7/2013 | Rogers et al. | 296/180.1 |

* cited by examiner

*Primary Examiner* — Joseph D Pape
(74) *Attorney, Agent, or Firm* — David J. Kreher

(57) ABSTRACT

This method of reducing the drag between coupled vehicles is designed to improve the aerodynamics of coupled vehicles by enclosing the gap between the coupled vehicles with a series of overlapping panels. The panels are attached to the leading vehicle and adjust along the top and sides of the trailing vehicle as the vehicle moves and turns so that while turning the gap between the leading vehicle and trailing vehicle remains enclosed.

6 Claims, 8 Drawing Sheets

AERODYNAMIC MULTIPLE TRAILER SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

1. Field of the Invention

A drag reducing apparatus for reducing drag between coupled vehicles which is designed to improve the aerodynamics of coupled vehicles by enclosing the gap between them with a series of overlapping panels. The panels are attached to the leading vehicle and adjust along the top and sides of the trailing vehicle as the vehicle moves and turns so that while turning the gap between the leading vehicle and trailing vehicle remains enclosed.

2. Background of the Invention

As a coupled vehicle moves, air moves over and around the leading vehicle and collects between the leading vehicle and the trailing vehicle, causing additional drag. The present disclosure decreases that drag by enclosing the gap between the leading vehicle and the trailing vehicle with a series of panels that adjust as the vehicle moves, while still ensuring that the gap remains enclosed. Several attempts have been made to increase the aerodynamics between coupled vehicles but the present disclosure can be distinguished from each.

In U.S. Pat. No. 4,756,256, Rains, et al., discloses multiunit railway car designed to reduce the amount of drag produced on a train as a result of the air vortices between carried cargo units on a single railcar and between railcars in a multicar train. These disclosures include slender frames designed be inserted into these gaps to promote streamlined flow past these gaps as well as solid horizontal and vertical panels used to shorten the gap between railcars. The present disclosure is distinguished from the Rains, et al., disclosure because it reveals solid horizontal and vertical panels that bridge the entire gap between multi-unit tractor-trailers In U.S. Pat. No. 8,167,358, Burrows, discloses an automatic gap closing system for use between coupled vehicles, whereas the present disclosure reveals a distinctly different design for a gap closing system between coupled vehicles.

In U.S. Pat. No. 8,496,285, Rogers, et al., discloses a collection of dynamically adjustable devices for use on vehicles where these air deflection devices can be controlled by sensors to adjust to wind speed, whereas the present disclosure presents a collection of solid horizontal and vertical panels used to prevent air from entering the gap between coupled vehicles b completely blocking the gap.

SUMMARY OF THE INVENTION

An apparatus for reducing drag between coupled vehicles, where the coupled vehicles are linked by a tow hitch means, when air enters the gap between the coupled vehicles by means of a collection of panels that overlap each other to enclose the gap between the leading vehicle and the trailing vehicle. Said panels include a top panel, a left panel and a right panel. The panels are attached to the leading vehicle by a U-shaped bow means. The top panel is attached to the U-shaped bow means by a plurality of fasteners and extends from the leading vehicle to the trailing vehicle and beyond the front edge of the trailing vehicle to such an extent that when the coupled vehicles turn, an air gap is not created along the trailing edge of the top panel. The left and right panels are attached to the U-shaped bow means by a plurality of spring loaded hinges located along the middle sections of the left panel and right panel. Said spring loaded hinges ensure the trailing edge of the left panel and right panel remain in contact with the trailing vehicle. A plurality of roller means are located along the trailing edge of the middle sections of the left panel and the right panel as well as the trailing edge of the top panel to ensure that the trailing vehicle is not damaged as the panels moved past the sides of the trailing vehicle. The left panel and right panel are L-shaped such that the panels parallel the sides of the coupled vehicles but the top portion of the left panel and right panel bend over and overlap the top panel. The bottom sections of the left panel and right panel attach to the middle section by a plurality of hinges, and is designed so that each can be folded up to allow access to the gap between the leading vehicle and trailing vehicle or folded down to improve aerodynamics.

DETAILED DESCRIPTION OF THE INVENTION

Figure 1:
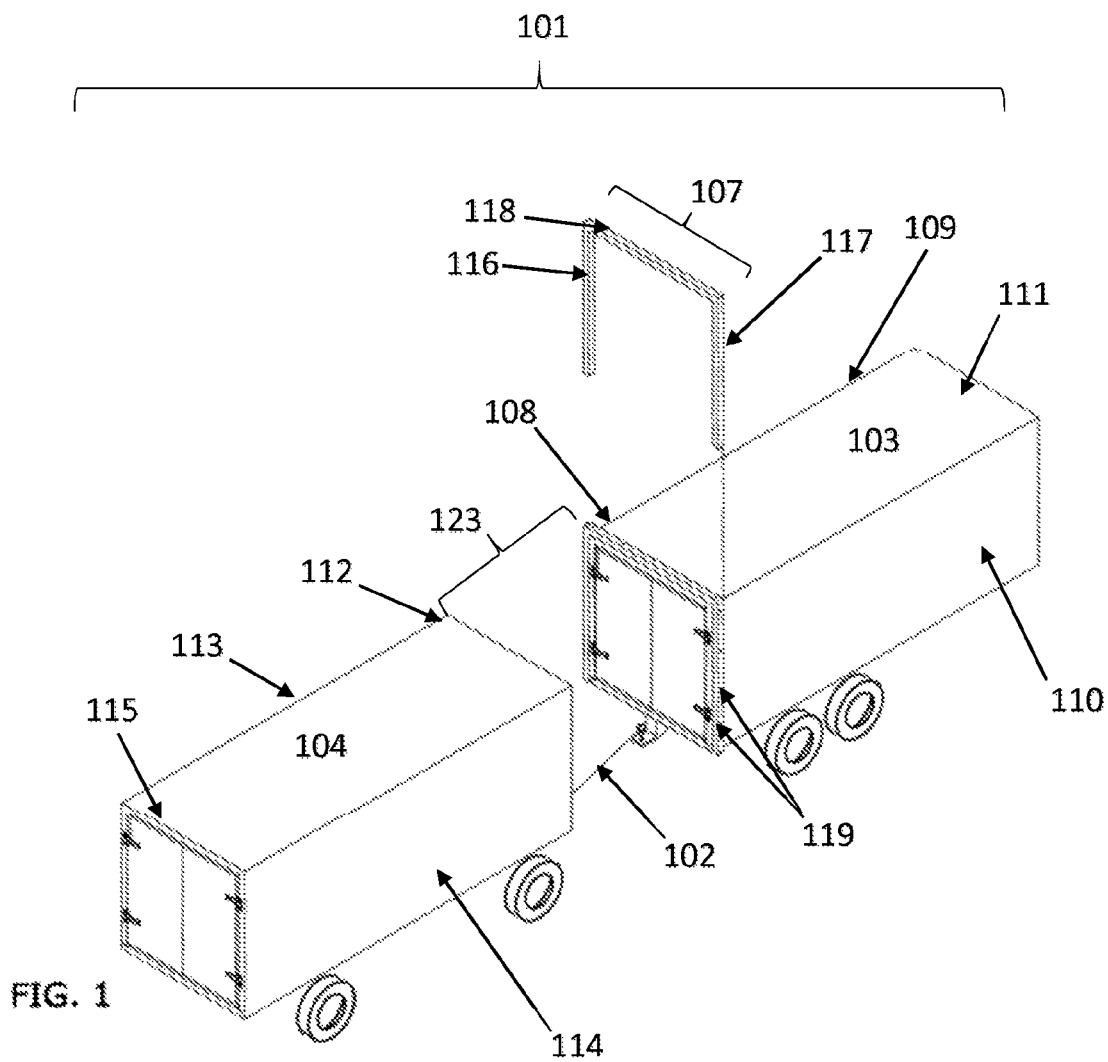
FIG. 1 is a view of the rear of the leading vehicle and the front of the rear vehicle, the gap between the coupled vehicles and the location of the U-shaped bow.
Figure 2:
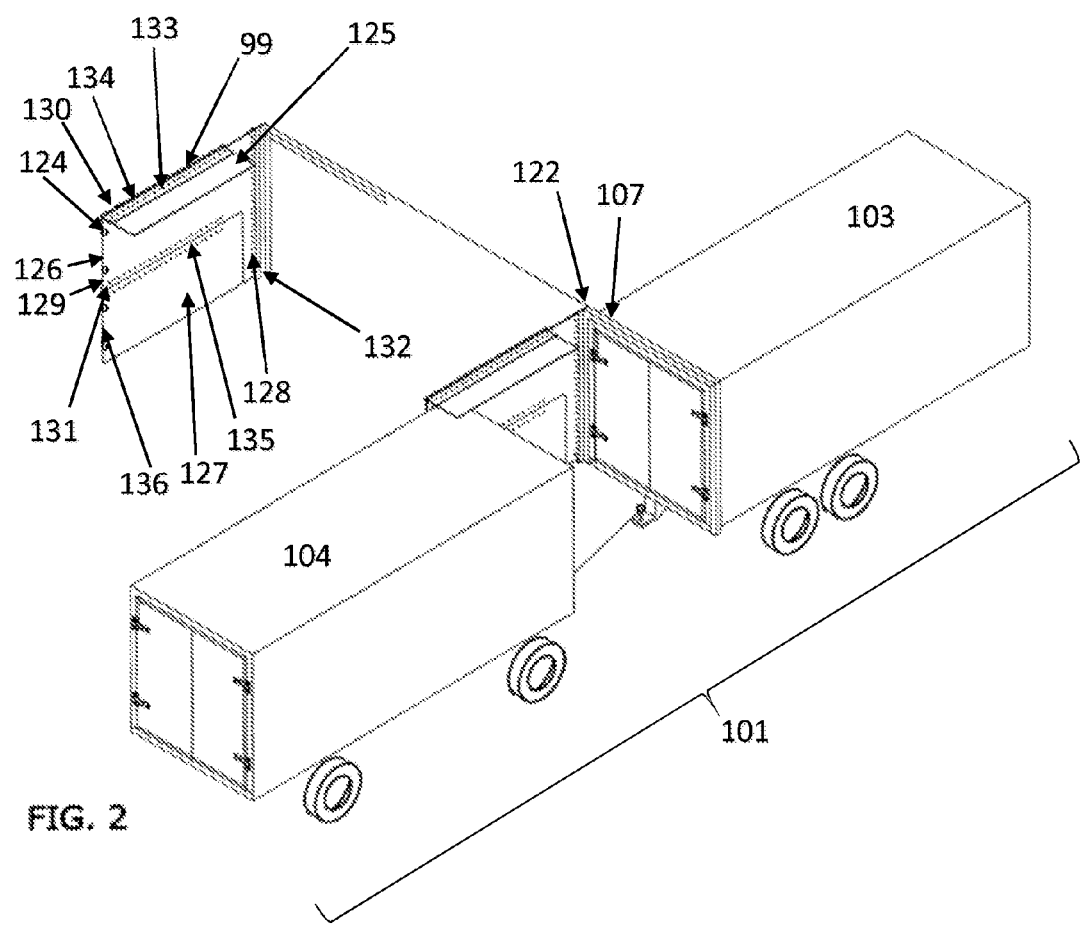
FIG. 2 is a view of the left side panel as it is positioned on the leading vehicle and the rear vehicle.
Figure 3:
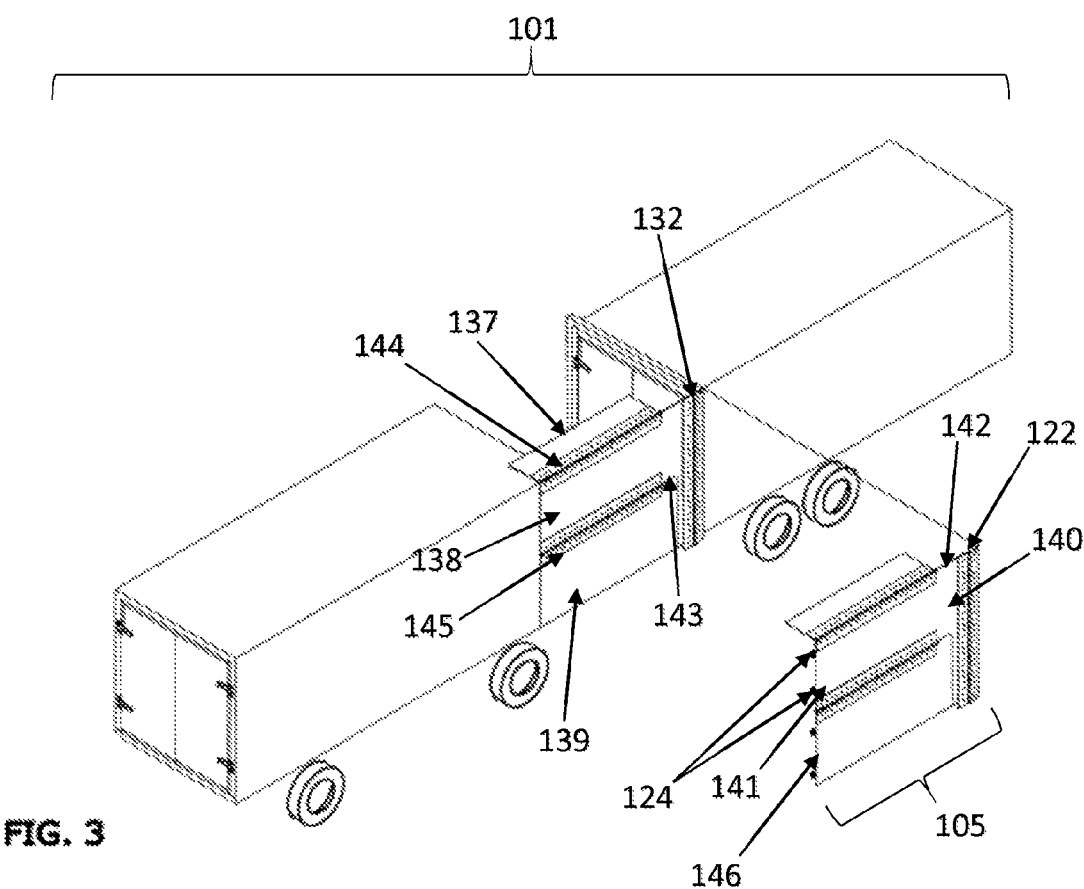
FIG. 3 is a view of the right side panel as it is positioned on the leading vehicle and the rear vehicle.
Figure 4:
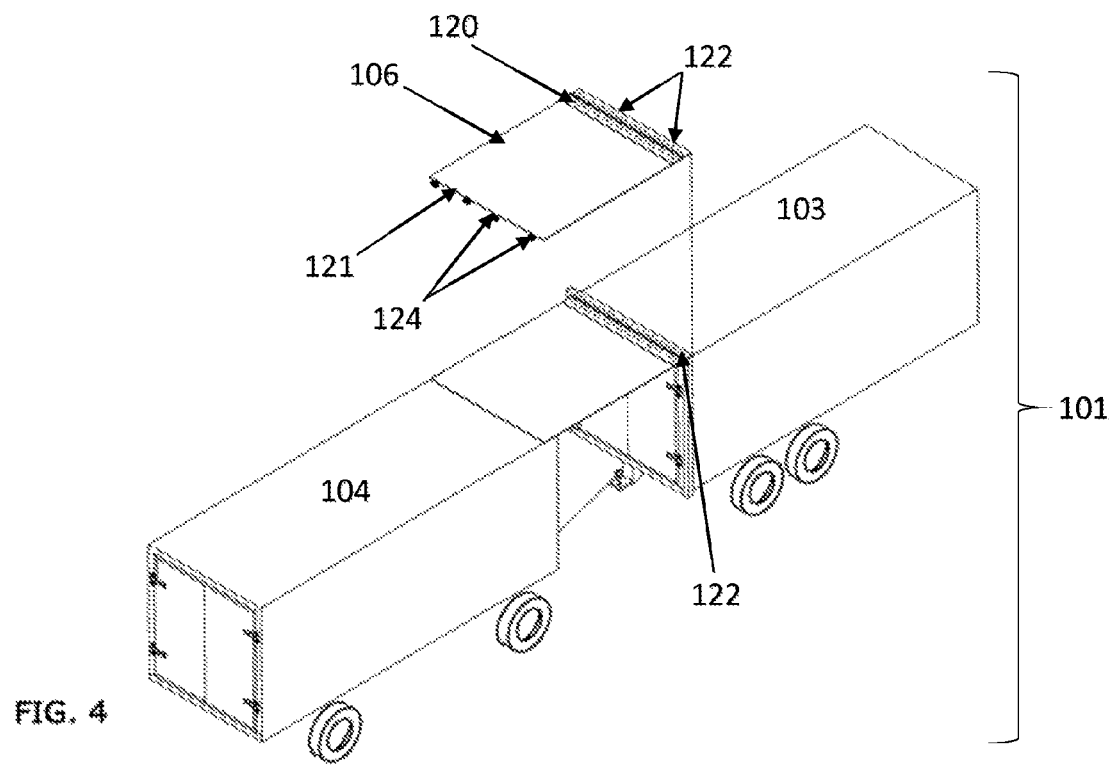
FIG. 4 is a view of the top panel as it is positioned on the leading vehicle and the rear vehicle.
Figure 5:
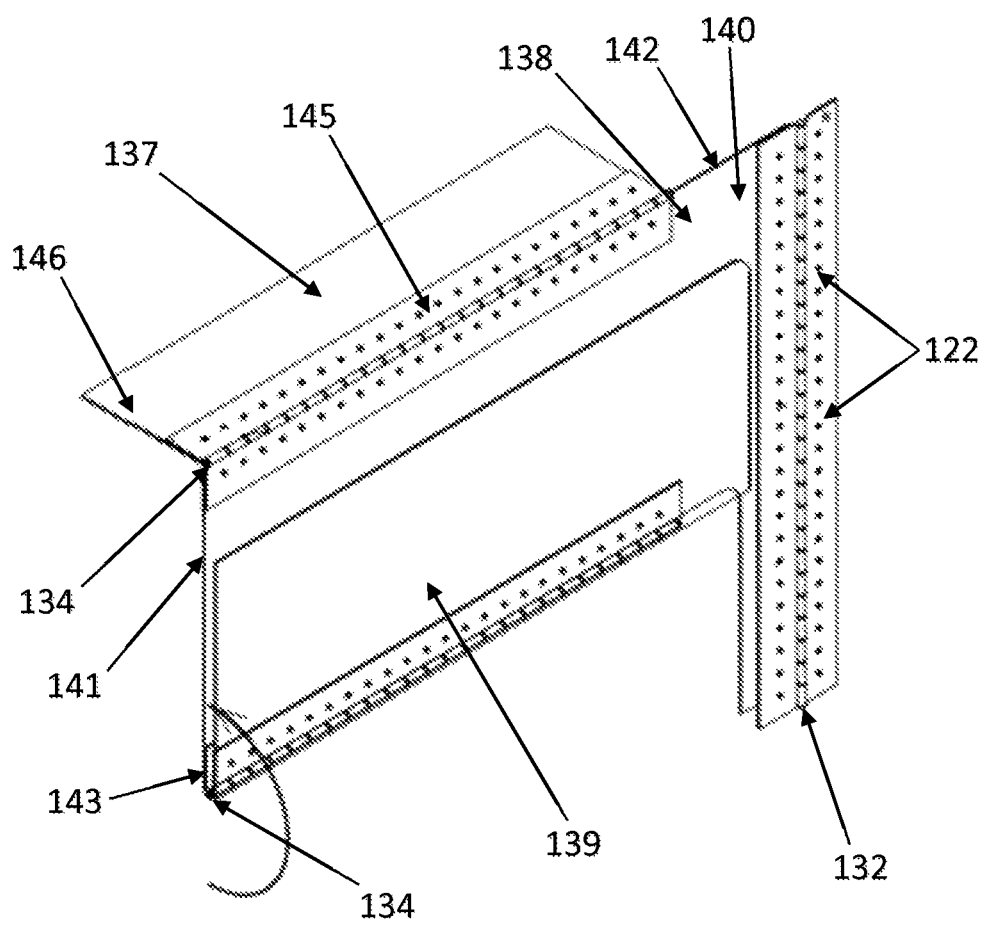
FIG. 5 is a view of the right side panel with the right lower section folded up over the right middle section.
Figure 6:
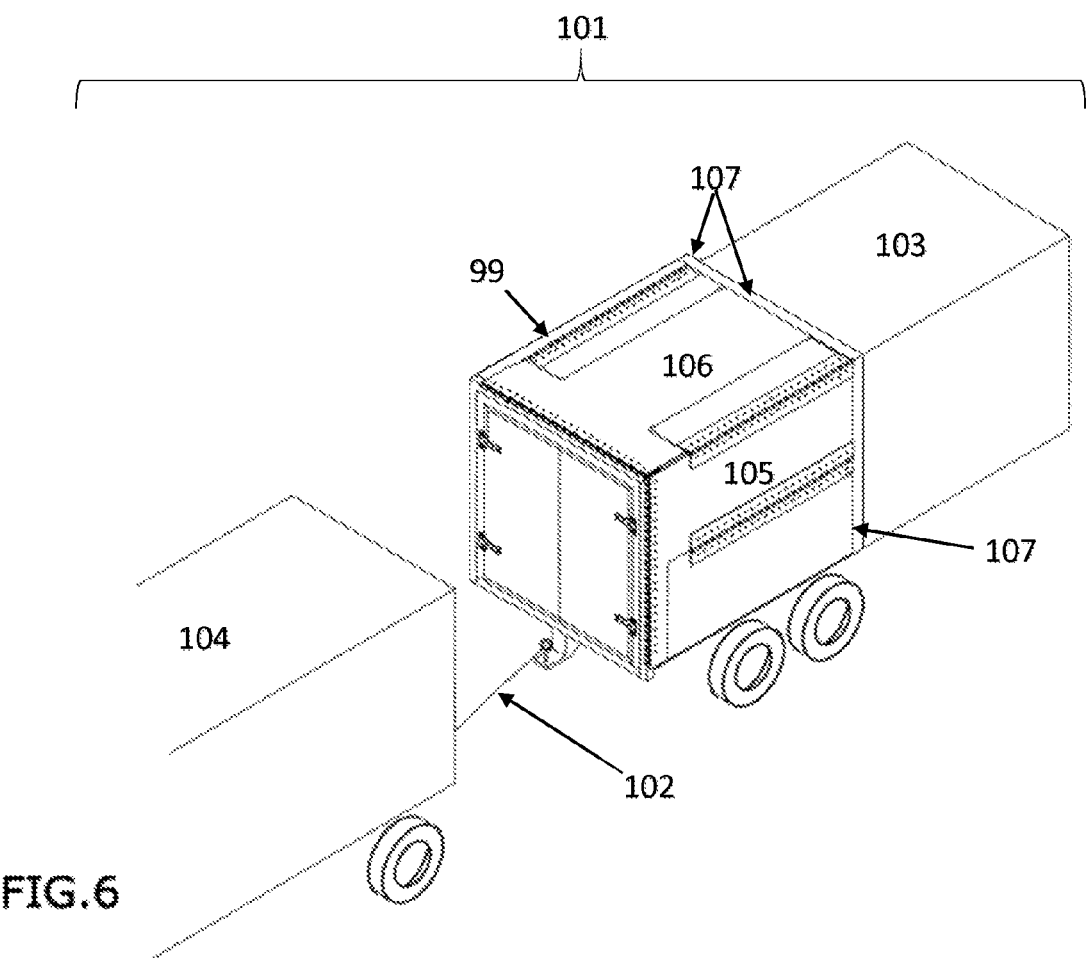
FIG. 6 is a view of the right side panel and top panel folded back over the leading vehicle.
Figure 7:
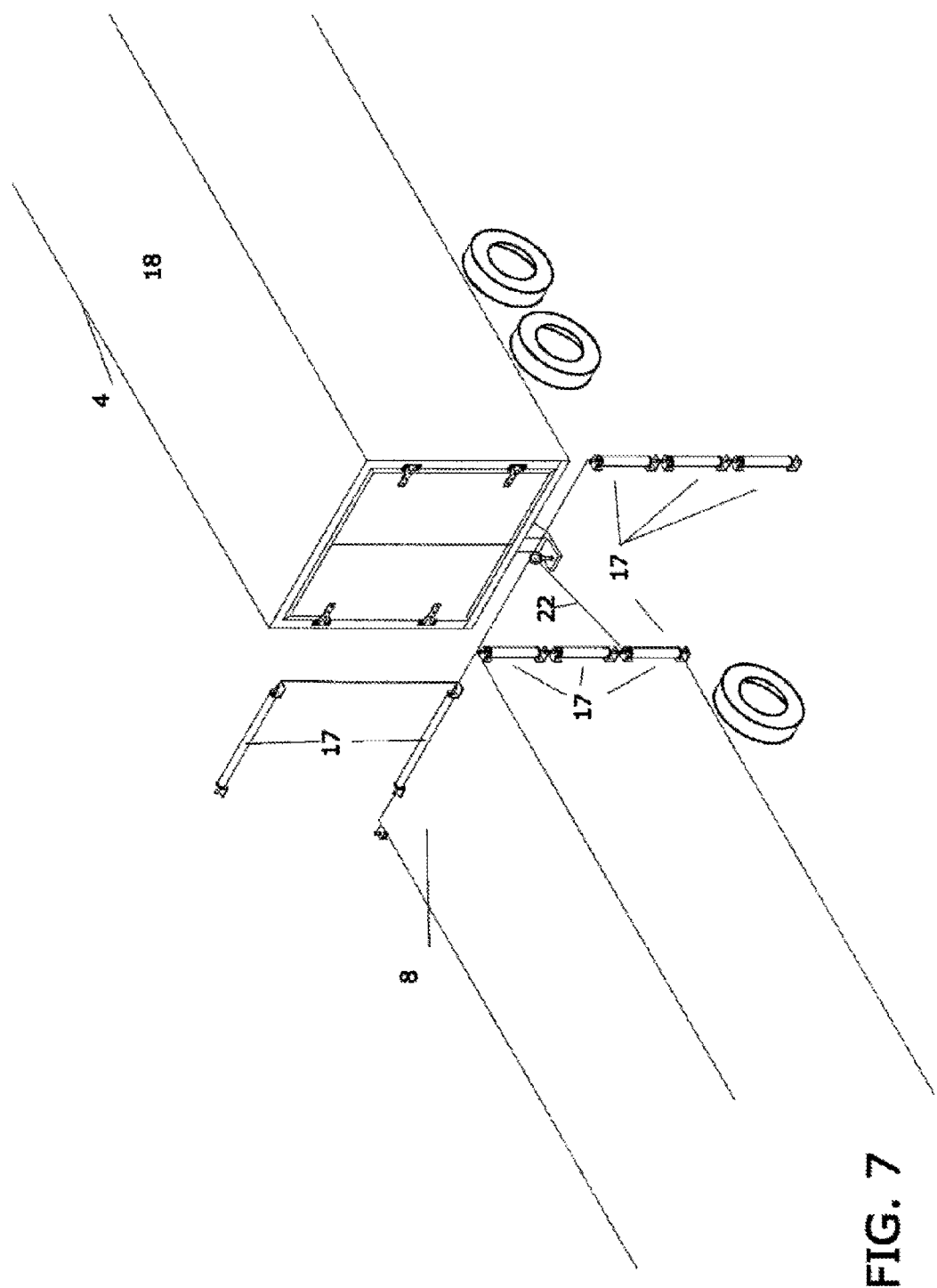
FIG. 7 is a view of the rollers associated with the right side panel and the top panel that facilitate the movement of the panels against the rear vehicle.
Figure 8:
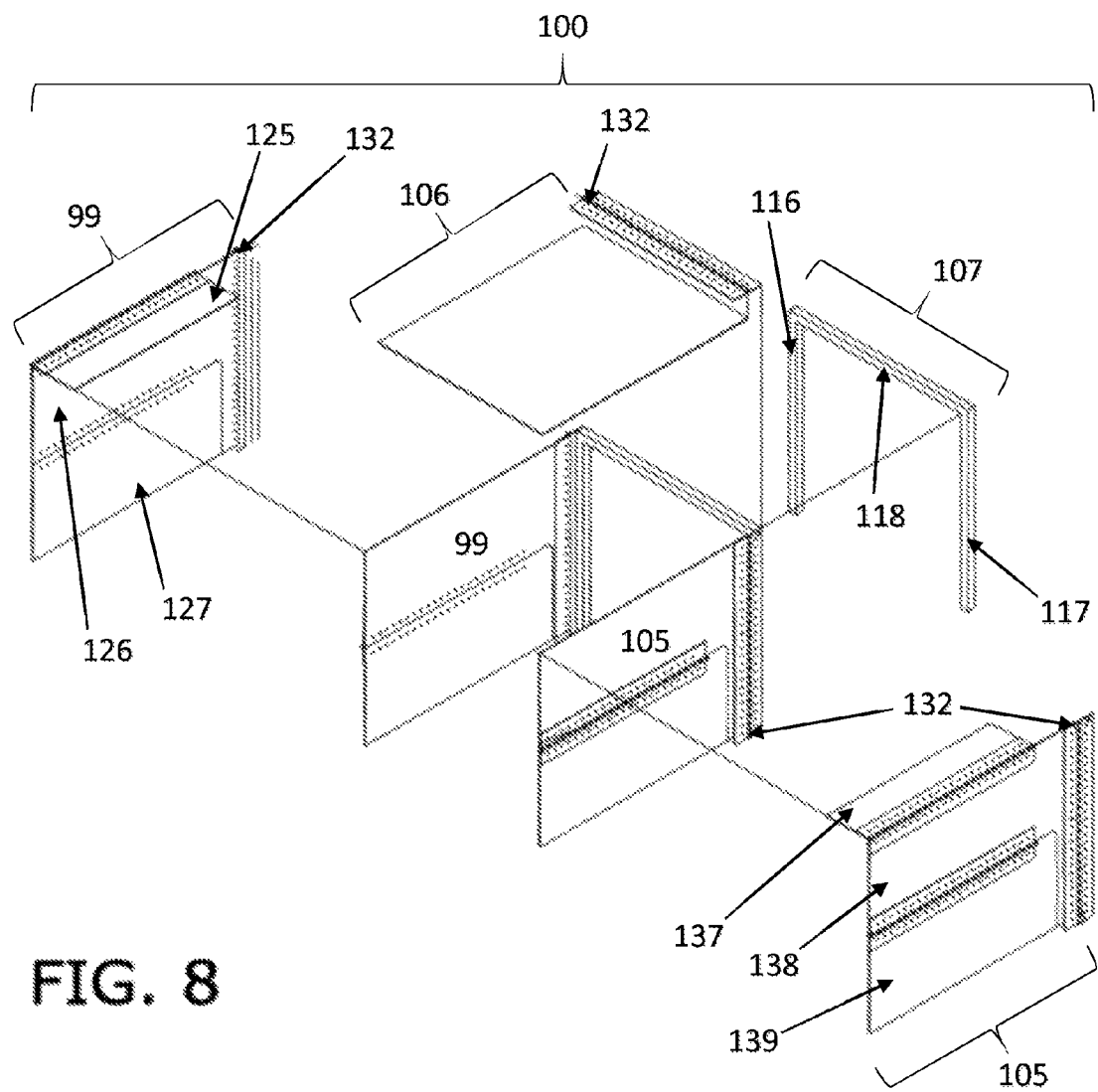
FIG. 8 is a view of the complete panel assembly.

A drag reducing apparatus 100 for reducing drag between coupled vehicles 101, where the coupled vehicles 101 are connected by a tow hitch means 102, where the coupled vehicles 101 include a leading vehicle 103 and a rear vehicle 104 and the drag reducing apparatus comprising a left side panel 99, a right side panel 105, a top panel 106 and a U-shaped bow means 107. The leading vehicle 103 has a rear 108, a left side 109, a right side 110 and a top 111. The rear vehicle 104 has a front 112, a left side 113, a right side 114, and a top 115. The U-shaped bow 107 means is made up of a left portion 116, a right portion 117 and a top portion 118. The U-shaped bow means 107 is attached to the leading vehicle 103 such that, the left portion 108 of the U-shaped bow means 107 is attached to the rear 108 of the left side 109 of the leading vehicle 103 by a plurality of fastening means 119, the right portion 117 of the U-shaped bow means 107 is attached to the rear 108 of the right side 110 of the leading vehicle 103 by a plurality of fastening means 119, and the top portion 118 of the U-shaped bow means 107 is attached to the rear 108 of the top 111 of the leading vehicle 103 by a plurality of fastening means 119. The left side panel 99 is attached to the left portion 116 of the U-shaped bow means 107. The right side panel 105 is attached to the right potion 117 of the U-shaped bow means 107. The top panel 106 is attached to the top portion 118 of the U-shaped bow means 107.

The top panel 106, which has a leading edge 120 and a trailing edge 121, has the leading edge 120 attached to the U-shaped bow means 107 by a plurality of fastener means 122 and extends from the U-shaped bow means 107 to beyond the front 112 of the rear vehicle 104 to such an extent that when the coupled vehicles 101 turn an air gap is not created that would otherwise allow excessive air to rush into the gap 123 between the coupled vehicles 101. The trailing edge 121 of the top panel 106 also has a plurality of roller means 124 attached to it to facilitate the movement of the top panel 106 against the top 115 of the rear vehicle 104.

The left side panel 104 has a left upper section 125, a left middle section 126 and a left lower section 127. The left middle section 126, has a leading edge 128, a trailing edge 129, a top edge 130 and a bottom edge 131, wherein the leading edge 128 of the left side panel 99 is attached to the U-shaped bow means 107 by a plurality of spring loaded hinges 132 located along the left portion 116 of the U-shaped bow means 107, where the left middle section 126 extends from the U-shaped bow means 107 to the rear vehicle 104 and extends beyond the front 112 of the rear vehicle 104 so that when the coupled vehicle 101 turns the trailing edge 129 of the left middle section 126 never enters the gap 123 between the leading vehicle 103 and rear vehicle 104. The trailing edge 129 of the left middle section 126 of the left side panel 99 also has a plurality of roller means 124 attached to it to facilitate the movement of the panels against the rear vehicle 104. The left upper section 125 of the left side panel 99, which has an outside edge 133, where the outside edge 133 is attached to the left middle section 126 by a plurality of hinges 134 that allows the left upper section 125 to fold back on the left middle section 126 or fold over the top portion 118 U-shaped bow means 107 to cover the gap 123 between the leading vehicle 103 and the rear vehicle 104 and overlaps the top panel 106. The left lower section 127 of the left side panel 99, which has a top edge 135 and a trailing edge 136, extends beyond the front 112 of the rear vehicle 104 so that when the coupled vehicles 101 turn the trailing edge 136 of the left lower section 127 never enters the gap 123 between the leading vehicle 103 and rear vehicle 104 and where the top edge 135 of the left lower section 127 of the left side panel 99 is attached to the bottom edge 131 of the left middle section 126 of the left side panel 99 by a plurality of hinges 134 such that the left lower section 127 can be folded up against the left middle section 126 to gain access to the gap 123 between the leading vehicle 103 and rear vehicle 104, or folded down to increase aerodynamic efficiency.

The right side panel 105 has a right upper section 137, a right middle section 138 and a right lower section 139. The right middle section 138, comprises a leading edge 140, a trailing edge 141, a top edge 142 and a bottom edge 143, wherein the leading edge 140 of the right side panel 105 is attached to the U-shaped bow means 107 by a plurality of spring loaded hinges 132 located along the right portion of the U-shaped bow means 107, where the right middle section 138 of the right side panel 105 extends from the U-shaped bow means 107 to the rear vehicle 104 and extends beyond the front 112 of the rear vehicle 104 so that when the coupled vehicles 101 turns the trailing edge 141 of the right middle section 138 never enters the gap 123 between the leading vehicle 103 and rear vehicle 104. The trailing edge 141 of the right middle section 138 also has a plurality of roller means 124 attached to it to facilitate the movement of the panels against the rear vehicle 104. The right upper section 137 of the right side panel 105, which comprises an outside edge 144, where the outside edge 144 is attached to the right middle section 138 by a plurality of hinges 134 that allows the right upper section 137 to fold back on the right middle section 138 or fold over the U-shaped bow means 107 to cover the gap 123 between the leading vehicle 103 and the rear vehicle 104 and overlaps the top panel 106. The right lower section 139 of the right side panel 105, which has a top edge 145 and a trailing edge 146, extends beyond the front 112 of the rear vehicle 104 so that when the coupled vehicles 101 turn the trailing edge 146 of the right lower section 139 never enters the gap 123 between the leading vehicle 103 and rear vehicle 104 and where the top edge 145 of the right lower section 139 is attached to the bottom edge 142 of the right middle section 138 of the right side panel 105 by a plurality of hinges 134 such that the right lower section 139 can be folded up against the right middle section 138 to gain access to the gap between the leading vehicle 103 and rear vehicle 104, or folded down to increase aerodynamic efficiency.

The plurality of spring loaded hinges 132 that attach the left middle section 126 of the left side panel 99 to the U-shaped bow means 107 and the right middle section 138 of the right side panel 105 to the U-shaped bow means 107 are spring-loaded to ensure the left side panel 99 and the right side panel 105 remain in contact with the rear vehicle 104. Along the trailing edge of the top panel 106, the trailing edge of the left middle section 126 of the left panel 99 and the trailing edge of the right middle section 138 of the right panel 105 are a plurality of roller means 124 that facilitate the movement of the left side panel 99, right side panel 105 and top panel 106 against the rear vehicle 104 while preventing the left side panel 99 and right side panel 105 and top panel 106 from scratching or causing damage to the rear vehicle.

In one preferred embodiment of the drag reducing apparatus 100, the top panel 106, left side panel 99 and right side panel 105 can be removed from the lead vehicle 103 when not necessary by disconnecting the left side panel 99 and right side panel 105 from the U-shaped bow means 107 at the spring loaded hinges 132 and disconnecting the top panel 106 from the U-shaped bow means 107 at the plurality of fastener means 122.

In a second preferred embodiment of the drag reducing apparatus 100, the top panel 106, left side panel 99 and right side panel 105 can be folded back against the leading vehicle 104 for storage by disengaging the plurality of spring loaded hinges 132 holding the left side panel 99 and the plurality of spring loaded hinges 12 holding the right side panel 105 to the rear vehicle, and by disengaging the plurality of fastener means 122 attaching the top panel to the top portion of the U-shaped bow means, so that the top panel 106 can be folded back over the top of the leading vehicle 103 for storage. In this instance, there are also a plurality of air foils 147 attached to the left side 109 of the leading vehicle 103, top 111 of the leading vehicle 103 and right side 110 of the leading vehicle 103 that prevent air from entering between the panels and the lead vehicle while the panels are in storage mode.

What is claimed:
1. A drag reducing apparatus for reducing the drag between coupled vehicles that include a leading vehicle and a rear vehicle, the drag reducing apparatus comprising a U-shaped bow means, a left side panel, a right side panel and a top panel;
the leading vehicle has a left side, a top, a right side, and a rear;
the U-shaped bow means has a left portion, a right portion and a top portion;
the U-shaped bow means is attached to the rear of the leading vehicle by a plurality of fastening means such that the top portion of the U-shaped bow means attaches to the top of the lead vehicle, the left portion of the U-shaped bow means attaches to the left side of the leading vehicle, and the right portion of the U-shaped bow means attaches to the right side of the leading vehicle;
the rear vehicle has a left side, a top, a right side, and a front;
the top panel has a leading edge and a trailing edge;
the leading edge of the top panel is attached to the top portion of the U-shaped bow means by a plurality of fasteners and extends from the rear of the leading vehicle and beyond the front of the rear vehicle to such an extent that when the coupled vehicles turn an air gap between the trailing edge of the top panel and the front of the rear vehicle is not created that would otherwise allow excessive air to rush into the gap between the coupled vehicles;
the trailing edge of the top panel possesses a plurality of roller means to facilitate the movement of the top panel against the top of the rear vehicle;
the left side panel has a left upper section, a left middle section and a left lower section;
the left middle panel further comprises a leading edge, a trailing edge, a top edge, and a bottom edge;
the leading edge of the left middle section of the left side panel is attached to the left portion of the U-shaped bow means by a plurality of spring-loaded hinges, and extends from the U-shaped bow means to the left side of the rear vehicle and extends beyond the front of the rear vehicle so that when the vehicle turns the trailing edge of the left middle section never enters the gap between the leading vehicle and rear vehicle;
the trailing edge of the left middle section of the left side panel possesses a plurality of roller means to facilitate the movement of the left panel against the rear vehicle;
the left upper section has an outside edge;
the outside edge of the left upper section of the left side panel is attached to the top edge of the left middle section of the left side panel by a plurality of hinges such that the left upper section can be folded to parallel the left middle section or fold over the top of the gap between the coupled vehicles, and to overlap the top panel;
the left lower section has a top edge and a trailing edge;
the top edge of the left lower section of the left side panel is attached to the bottom edge of the left middle section of the left side panel by a plurality of hinges such that the left lower section can be folded up to gain access to the gap between the leading vehicle and rear vehicle or folded down to increase aerodynamic efficiency;
the left lower section of the left side panel begins at the rear of the leading vehicle and the trailing edge of the left lower section of the left side panel extends beyond the front of the rear vehicle so that when the vehicle turns the trailing edge of the left lower section never enters the gap between the leading vehicle and rear vehicle;
the right side panel has a right upper section, a right middle section and right a lower section;
the right middle section further comprises a leading edge, a trailing edge, a top edge and a bottom edge;
the leading edge of the right middle section of the right side panel is attached to the right side of the U-shaped bow means by a plurality of spring-loaded hinges, and extends from the U-shaped bow means to the right side of the rear vehicle and extends beyond the front of the rear vehicle so that when the vehicle turns the trailing edge of the right middle section never enters the gap between the leading vehicle and rear vehicle;
the trailing edge of the right middle section of the right side panel possesses a plurality of roller means to facilitate the movement of the right panel against the rear vehicle;
the right upper section has an outside edge;
the outside edge of the right upper section of the right side panel is attached to the top edge of the right middle section of the right side panel by a plurality of hinges such that the right upper section can be folded over to parallel the right middle section or fold over the top of the gap between the coupled vehicles, and to overlap the top panel;
the right lower section has a top edge and a trailing edge;
the top edge of the right lower section of the right side panel is attached to the bottom edge of the right middle section of the right side panel by a plurality of hinges such that the right lower section can be folded up to gain access to the gap between the leading vehicle and the rear vehicle or folded down to increase aerodynamic efficiency;
the right lower section of the right side panel begins at the rear of the leading vehicle and the trailing edge of the right lower section of the right side panel extends beyond the front of the rear vehicle so that when the vehicle turns the trailing edge of the right lower section never enters the gap between the leading vehicle; and
the spring-loaded hinges that attach the left middle section of the left side panel and the right middle section of the right side panel to the U-shaped bow means are spring-loaded to ensure the left side panel and right side panel remain in contact with the rear vehicle.

2. The apparatus for reducing the drag between coupled vehicles of claim 1 where the spring-loaded hinges can be disengaged to allow the left side panel or the right side panel to be removed from the leading vehicle.

3. The apparatus for reducing the drag between coupled vehicles of claim 2 where the plurality of fastening means can be disengaged to allow the top panel to be removed from the leading vehicle.

4. The apparatus for reducing the drag between coupled vehicles of claim 1 where the spring-loaded hinges can be disengaged to allow the left side panel or the right side panel to be folded back over the sides of the leading vehicle for storage when there is no rear vehicle.

5. The apparatus for reducing the drag between coupled vehicles of claim 4 where the plurality of fastening means allows the top panel to be folded over the top of the leading vehicle for storage when there is no rear vehicle.

6. The apparatus for reducing the drag between coupled vehicles of claim 5 that includes small air foils on the left side of the leading vehicle, the right side of the leading vehicle and the top of the leading vehicle that prevent air from entering between the top panel, left panel and right panel when the panels are in storage mode.

* * * * *